United States Patent Office 3,407,844
Patented Oct. 29, 1968

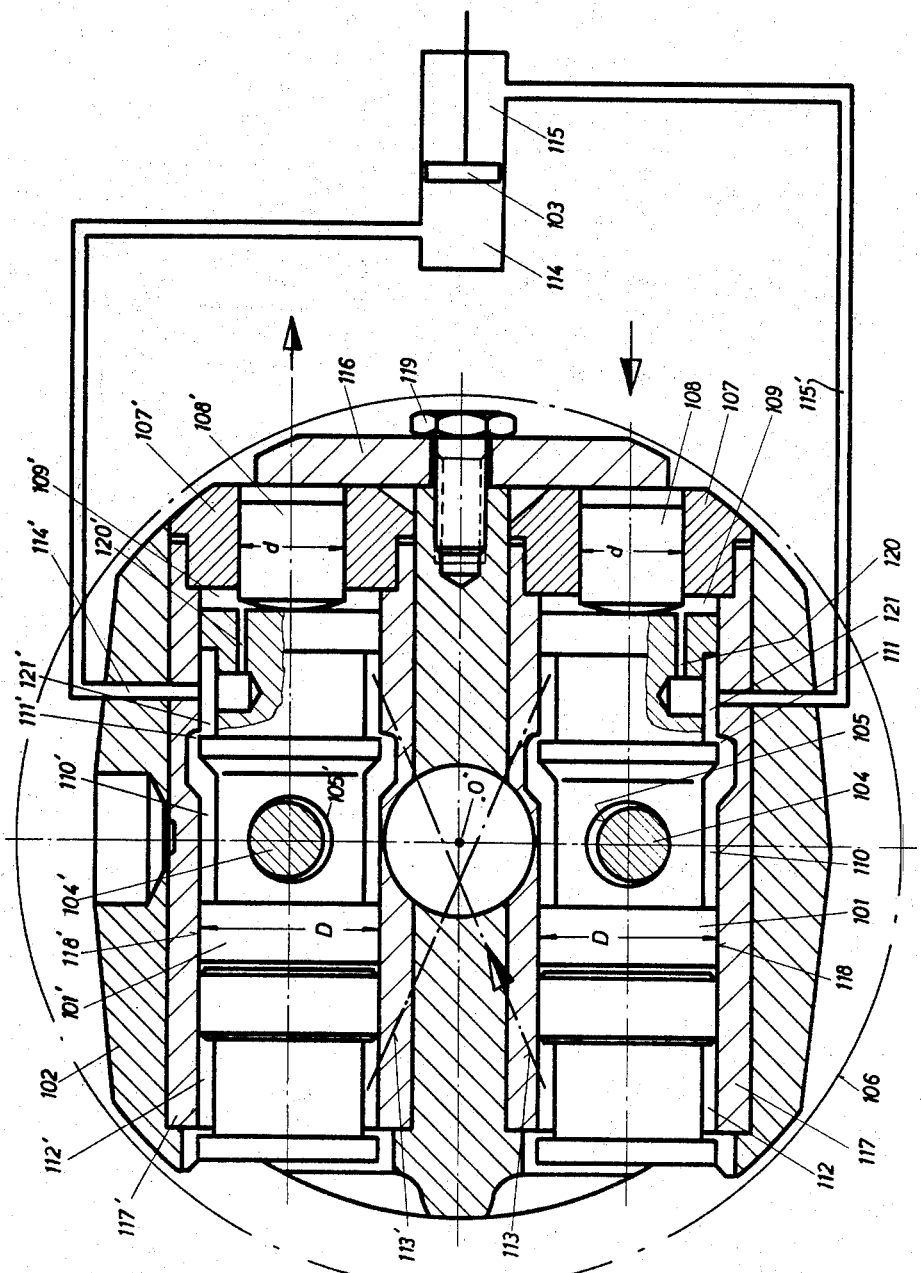

3,407,844
VALVE FOR POWER STEERING SYSTEMS
Joerg Linser, Durlangen, Germany, assignor to Zahnradfabrik Friedrichshafen, Aktiengesellschaft, Friedrichshafen am Bodensee, Germany
Filed Apr. 4, 1966, Ser. No. 539,802
Claims priority, application Germany, Apr. 3, 1965,
Z 11,451
2 Claims. (Cl. 137—596)

ABSTRACT OF THE DISCLOSURE

The arrangement provides for the use of movable members subjected to booster oil pressure which act against booster pressure control valves in order to simulate vehicle wheel turning resistance in the course of steering.

---

This invention relates to power steering systems of the kind shown in U.S. Patent 3,180,233, to E. Jablonsky assigned to the assignee of the present application.

In the previous patent there is shown a pair of spool valves 67 and 68 operable by respective fingers 58 and 59 secured to a tubular shaft 47 which has relative rotation by virtue of the effect of a concentric torsion bar 50 within the tubular shaft in a manner fully explained in that patent. In order to provide a steering resistance ("road feel") against manual operation of the steering wheel the spool valves have differential areas exposed to pressure to effect a differential net force which a vehicle driver must overcome.

To effect different degrees of such "road feel" with the prior arrangement, it is necessary to change valve spools. Thus, where any particular degree of "road feel" is desired, a relatively expensive manufacturing setup is required to produce and machine valve spools for a desired degree of steering resistance.

The present invention overcomes the need for producing different sets of valve spools for respective degrees of steering resistance by using simple interchangeable components and, thus, effects simplification, economy, and improvement over the prior invention, these being the primary objects.

Other objects and features of the invention will be apparent with further detailed description.

Briefly, the present invention provides a chamber at an end face of each valve with means for conducting or cutting off pressure thereto. A slidable plug closes each chamber, an exterior end of each plug being always exposed to pressure and the inner end abutting a respective valve. The other end faces of each valve are always exposed to pressure so as to have a constant force in one direction, as in the prior patent. When either chamber is exposed to pressure the force is equal and opposite to the constant force and the valve is balanced. When either chamber is cut-off from pressure, only the pressure acting on the plug provides an opposing force to the constant force, causing an unbalance which must be overcome by manual effort. Plugs can be made of different diameters relative to the valve spool diameters and by substituting one set of plugs for another a desired degree of "road feel" can be achieved.

The drawing shows a vertical cross section through an assembly of the essential components of the present invention and illustrates a valve carrier housing or flange 102 in a booster steering valving mechanism, wherein the member 102 corresponds generally to the flange 31 of the above-mentioned patent. It will be understood that housing 102 rotatably mounted in a suitable support (not shown) such as flange 33 of the prior patent, and that an annular pressure feed channel 106, symbolized by a phantom line circle, surrounds housing 102 in a manner taught by the annular channel 74 of the prior patent. Housing 102 is, of course, rotative about the axis 0 of the steering column or spindle in the same manner as provided for the flange 31 of the prior patent. A suitable yoke construction (not shown) carries fingers 104 and 104' integrally with the steering column, which fingers are rotatable around the axis 0 as provided for the fingers 58 and 59 of the prior patent. Fingers 104 and 104' protrude into longitudinal recesses 105 and 105', respectively, of the valve spools 101 and 101', respectively, which are longitudinally slidable in housing 102, the housing being connected to a torsion bar actuation, all as heretofore explained in the previous patent for flange 31 thereon. When there is no manual torque exerted on the steering column, members 102, 104 and 104' remain in neutral or centered position, as shown in the drawing. When, however, the steering column is rotated, the relative rotational movement effected by the torsion bar connection between the steering column and housing 102 causes the valve spools 101 and 101' to be actuated longitudinally in the direction of the arrows for a right-hand turn or in the opposite direction of the arrows for a left-hand turn. The valve spools move in respective bores 118 and 118' of bushings 117 and 117', which bushings can be pressed into housing 102 in a well known manner. The bushings are closed by respective collars 107 and 107' having apertures sealed by slidable plugs 108 and 108', respectively, at corresuonding ends of the valve spools. The collars 107 and 107' have a sealing fit in housing 102 and are secured by means of a bar 116. The bar 116 is releasably attached to the housing by means of a screw 119. Thus, the collars and plugs can be provided interchangeably in various diametric dimension of pairs of plugs.

Such interchangeability is for the purpose of changing steering resistance of the system.

Intermediate the valve spools and the collars 107, 107' are respective balancing chambers 109 and 109' effected in the respective bushings by the collars, plugs, and valve spool ends. These chambers connect with respective annular grooves 121 and 121' in the valve spools through respective narrow longitudinal passages 120 and 120' at the ends of the valve spools.

The opposite ends of the valve spools have respective annular grooves 112 and 112'. In the event that either valve spool is moved to the left, as seen on the drawing, the annular groove 112 or 112' remains in communication with the pressure supply channel 106. If a valve spool is moved to the right, the respective annular groove 112 or 112' is closed off within the respective bushing. However, the annular groove 112 is connected with the chamber 109' through a channel 113 (indicated by slanted phantom arrow) and groove 121' and passage 120'. Likewise, annular groove 112' is connected with chamber 109 through a channel 113' (indicated by slanted phantom line), groove 121 and passage 120. At the center of each valve spool an oil return recess, respectively, 110 and 110', is provided between the spool and the respective bushing 117 and 117'. These two return flow recesses are closable by the annular shoulders 111 and 111' of the respective spools.

The annular groove 121 is connected with pressure chamber end 115 of the double acting booster cylinder. Annular groove 121' is connected with pressure chamber end 114 of the booster cylinder. The return recesses 110 and 110' will be understood to be connected to an oil return line which has not been shown.

In operation, if the steering column is turned clockwise, the fingers 104 and 104' move clockwise around axis 0. Housing 102 follows the fingers to a degree effected by the relative angular motion permitted by the torsion rod in a well understood manner. Simultaneously, the valve spool 101' is shifted toward the right while spool 101 is shifted to the left, as indicated by the arrows. This action of the valve spools continues until recess 110' is closed by shoulder 111'. Groove 112 of valve spool 101 communicates with pressure channel 106. At this time groove 21' communicates with pressure feed channel 106 via channel 113. Thus, pressure will pass through the line 114' to chamber 114 to shift booster piston 103 to the right. Exhaust oil from chamber 115 flows through line 115', groove 121, return recess 110, to the oil reservoir (not shown) connected to recesses 110 and 110'.

The clockwise movement effects, of course, a right turn of the vehicle. The areas at the right hand faces of plugs 108 and 108' are always exposed to feed pressure in channel 106 and thus biased against the corresponding right-hand faces of valve spools 101 and 101'. Thus, as valve spool 101' moves to the right it cuts off groove 112' and the feed through channel 113' whereby, as a result of ring groove 121 being opened to the oil return recess 110, pressure in chamber 109 drops. However, pressure at the right-hand face of plug 108 causes it to push against the right-hand face of valve spool 101, in the direction of the manual force; but due to the fact that there is a larger area of valve spool 101 exposed to feed pressure (in channel 106) at its left end, manual force must be applied sufficient to overcome the loss of pressure in chamber 109. Thus, such manual force P required is:

$$P = p\left(\frac{\pi D^2}{4} - \frac{\pi d^2}{4}\right)$$

where $p$ is the unit pressure and $$\frac{\pi D^2}{4}$$

is the face area of the valve spool and $$\frac{\pi d^2}{4}$$

is the face area of the plug. Valve spool 101' is at this time balanced because chamber 109' is open to feed pressure via channel 113.

For a left-hand turn of the vehicle, counterclockwise movement of the valve spools and housing 102 is effected. Valve spool 101' moves to the left and valve spool 101 moves to the right. Pressure oil flows to chamber 115 via line 115' from groove 112', channel 113' and groove 121. Exhaust oil from chamber 114 goes via line 114', groove 121' and exhaust recess 110' to the oil reservoir (not shown). The valve spool 101 is then pressure balanced, chamber 109 being open to feed pressure via channel 113'. Valve spool 101' is then unbalanced because channel 113 is closed when groove 112 is closed with movement of valve spool 101 to the right, thus pressure is cut-off to chamber 109' and only the pressure on the exterior face of plug 108' acts against valve spool 101'.

It will be apparent that to change the degree of steering resistance all that is needed is removal of bar 116 and replacement of collars 107, 107' and plugs 108, 108', by a pair of collars and plugs of another bore and diameter, respectively.

In some vehicles no steering resistance is desirable and, accordingly, completely closed collars with no plugs can be used, i.e. $D=d$. Normally, $d<D$ to provide some degree of steering resistance.

It will be noted that the inner faces of plug 108, 108' are preferably rounded so as to have substantially point contact with respective valve end faces. Thus, no significant area of the end faces is shielded from pressure in the respective chambers at any time.

What is claimed is:

1. Structure comprising a valve housing, a pair of movable valves co-acting therewith for pressure fluid control, means providing a chamber at a first end face of each of said valves in which the respective end face is exposed, and means for connecting each said chamber to a source of pressure, the other end face of each of said valves being exposed to said pressure, a respective movable element protruding into each of said chambers having an external face smaller than the respective other end face and exposed to said pressure, and said elements being abuttable with the first end faces of the respective valves to effect a force thereagainst opposed to but less than the force acting on the other end face, and means to alternately connect said chambers to or cut off said chambers from said source of pressure, whereby an unbalance of force on said valves is effected which must be overcome by manual steering effort.

2. In a system as set forth in claim 1, said chambers being disposed at corresponding ends of said valves and formed in said housing, and mounting means for said movable elements comprising collars having sealing and removable coaction with said housing and each collar having an aperture, each said movable element having a slidable sealing fit in a respective collar aperture.

References Cited
UNITED STATES PATENTS 3,180,233   4/1965   Jablonsky _____ 91—374

HENRY T. KLINKSIEK, *Primary Examiner.*

PAUL E. MASLOUSKY, *Assistant Examiner.*